United States Patent [19]
Gibson

[11] Patent Number: 5,526,480
[45] Date of Patent: Jun. 11, 1996

[54] TIME DOMAIN SCROLL BAR FOR MULTIMEDIA PRESENTATIONS IN A DATA PROCESSING SYSTEM

[75] Inventor: Kevin P. Gibson, Rochester, Minn.

[73] Assignee: International Business Machines Corporation, Armonk, N.Y.

[21] Appl. No.: 541,859

[22] Filed: Oct. 11, 1995

Related U.S. Application Data

[63] Continuation of Ser. No. 997,396, Dec. 28, 1992, abandoned.

[51] Int. Cl.$^6$ .................................................. G06T 1/00
[52] U.S. Cl. ........................................ 395/154; 395/155
[58] Field of Search ................................. 395/154–156, 395/161; 345/119–120, 146, 156; 358/335, 342

[56] References Cited

U.S. PATENT DOCUMENTS

| | | | |
|---|---|---|---|
| 3,753,240 | 8/1973 | Merwin | 340/172.5 |
| 3,971,141 | 7/1976 | Wilson | 35/8 A |
| 4,406,626 | 9/1983 | Anderson et al. | 434/169 |
| 4,893,256 | 1/1990 | Rutherford et al. | 364/518 |
| 4,943,866 | 7/1990 | Barker et al. | 358/335 |
| 4,954,969 | 9/1990 | Tsumura | 364/521 |
| 4,956,806 | 9/1990 | Crowe et al. | 364/900 |
| 5,065,345 | 11/1991 | Knowles | 395/154 |
| 5,157,511 | 10/1992 | Kawai | 358/335 |
| 5,191,645 | 3/1993 | Carlucci et al. | 395/159 |
| 5,202,961 | 4/1993 | Mills et al. | 395/159 |
| 5,237,528 | 8/1993 | Mills et al. | 395/133 |
| 5,276,795 | 1/1994 | Hoeber | 395/156 |
| 5,307,456 | 4/1994 | MacKay | 395/154 |

FOREIGN PATENT DOCUMENTS

| | | |
|---|---|---|
| 0390048A2 | 10/1990 | European Pat. Off. . |
| 1-234891 | 9/1989 | Japan . |
| 1-235438 | 9/1989 | Japan . |
| 2-108337 | 4/1990 | Japan . |
| 2-289087 | 11/1990 | Japan . |

OTHER PUBLICATIONS

Michael Mills, "A Magnifier Tool for Video Data", May 3–7, 1992, pp. 92–98, Proceedings of '92 Conference on Human Factors in Computer Systems.
Richard Chimera, "Value Bars: An Information Visualization and Navigation Tool for Multi–Attribute Listings," May 3–7, 1992 Proceedings of '93 Conference on Human Factors in Computer Systems pp. 293–294.
Leo Degen et al., "Working with Audio: Intergating Personal Tape Recorders and Desktop Computers," May 3–7, 1992 Proceedings of '92 Conf. on Human Factors in Comp. Sys.
Michael Mills, "Media Composition for Casual Users," IEEE Computer Soc. Press, 1992, pp. 52–57.
Michael D. Murie, "Media Maker Makes Mac Move," Mac Week Mar. 26, 1991, pp. 53–55.
Hyper Card User's Guide, Apple Computer Inc., 1988 p. 162.
Microsoft Windows, 1987, Book1: Microsoft Windows User's Guide, Chapter 4: Techniques, p. 71.
IBM Technical Disc. Bulletin vol. 31 No. 9, Feb. 1989 "Screen Format For A Basic Audio Editor" pp. 46–51.

*Primary Examiner*—Heather R. Herndon
*Assistant Examiner*—Joseph H. Feild
*Attorney, Agent, or Firm*—L. Bruce Terry; Andrew J. Dillon

[57] ABSTRACT

A method and system in a data processing system for efficiently managing the selection and/or presentation of a multimedia data set comprised of multiple topics. A display is provided for presenting a multimedia data set. A graphic control mechanism having multiple portions is presented within the display. Each of the portions of the graphic control mechanism is associated with a selected one of the multiple topics, and such an association is graphically displayed. A user is then permitted to select one of the multiple portions of the graphic control mechanism. In response to a user selection of one of the multiple portions, an associated one of the multiple topics is automatically presented.

16 Claims, 5 Drawing Sheets

TIME DOMAIN SCROLL BAR FOR MULTIMEDIA PRESENTATIONS IN A DATA PROCESSING SYSTEM

This is a continuation-in-part of application Ser. No. 07/997,396, filed 28 Dec. 1992 now abandoned.

BACKGROUND OF THE INVENTION

1. Technical Field

The present invention relates in general to an improved data processing system, and in particular to a method and system for managing the presentation of multimedia data sets having a plurality of topics within a multimedia presentation operating within a data processing system. Still more particularly, the present invention relates to a method and system for graphically associating topics within a multimedia data set with a selected portion of a graphic control mechanism and thereafter utilizing the graphic control mechanism to manage the presentation of the multimedia data set.

2. Description of the Related Art

Computer systems are capable of communicating information with humans in many formats, including: text, graphics, sounds (including high-fidelity stereo), animated graphics, synthesized speech, and video. "Multimedia" means utilizing several communication sources contemporaneously. A multimedia presentation utilizes a data processing system to combine such information formats into a coherent and comprehensive presentation. Multimedia brings together a variety of hardware and software tools with the common goal of utilizing a data processing system in a manner which involves the human senses, especially sight and hearing, and which gives users the sense of interactive control of the data processing system.

One advantage of a multimedia presentation is the ability to convey to a user large amounts of information quickly and efficiently. Such an ability to process large amounts of data may also be a disadvantage for users and programmers of multimedia systems. For example, most data processing system users want immediate access to particular information without having to wait during presentations of undesired data or without spending an unreasonable amount of time manipulating hardware and software attempting to locate desired data. Often, the desired data is only a small fraction of the size of the data set containing the desired data. For example, consider a data set representing an hour-long speech by a political candidate. The desired data may be audio and video data representing a single sentence from the hour-long speech.

In known data processing systems, several graphic control mechanisms have been utilized to permit a user to select a desired location within a multimedia presentation. Such graphic control mechanisms include "scroll bars," "spin button controls" and "slider controls." A user may use such control mechanisms to select a starting point from which to begin a multimedia presentation, or to find a particular location in order to modify data, create new data, or perform some other editing function. The location may be referenced by the relative time from the beginning of the multimedia presentation, or the location may be referenced to a known frame number within the multimedia presentation.

One example of a scheme used to reference data which is presented in the time domain is the time code utilized by the Society of Motion Picture and Television Engineers (SMPTE time code). The SMPTE time code assigns each frame of a video presentation a unique number which allows for indexing and precise video tape control. The SMPTE time code signal may be recorded as a modulated audio signal on an audio channel, as a dedicated address track (called Longitudinal Time Code, or LTC), or as a visible digital signal in the vertical blanking interval above the active picture area (called Vertical Interval Time Code, or VTC). Frames are identified in an hours-minutes-seconds-frames format. For example, 01:14:34:12 refers to the 12th frame in the 35th second in the 15th minute in the second hour.

By utilizing such referencing systems for time domain data sets, data processing system users may quickly and efficiently access a particular frame of data among thousands of frames. However, a particular frame address may not have meaning for a user attempting to select a portion of a multimedia presentation or a user attempting to edit a multimedia presentation. If the frames are referenced only by a unique frame identifier, such as a SMPTE time code, a user may be able to estimate where a desired portion of data is located; however, the user may frequently have to spend substantial time searching for the desired location. A multimedia system user is more likely to intuitively understand, and more likely to be able to access desired data, utilizing a multimedia system in which the user may access data within a multimedia presentation by referring to an idea, topic, or relative location, rather than by referring to portions of the data set by a range of SMPTE time codes.

In view of the above, it should be appreciated that a need exists for a method and system for providing access to particular portions of a multimedia presentation by manipulating a graphic control mechanism which includes selected portions which are associated with ideas, topics, or relative locations within the multimedia data set, wherein a user may selectively access portions of a data set by referring to the idea, topic, or relative location of the selected portion.

SUMMARY OF THE INVENTION

It is therefore one object of the present invention to provide an improved data processing system.

It is another object of the present invention to provide an improved method and system for managing the selection and/or presentation of multimedia data sets having a plurality of topics within a multimedia presentation operating within a data processing system.

The foregoing objects are achieved as is now described. A method and system are disclosed in a data processing system for efficiently managing the selection and/or presentation of a multimedia data set comprised of multiple topics. A display is provided for presenting a multimedia data set. A graphic control mechanism having multiple portions is presented within the display. Each of the portions of the graphic control mechanism is associated with a selected one of the multiple topics, and such an association is graphically displayed. A user is then permitted to select one of the multiple portions of the graphic control mechanism. In response to a user selection of one of the multiple portions, an associated one of the multiple topics is automatically presented.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
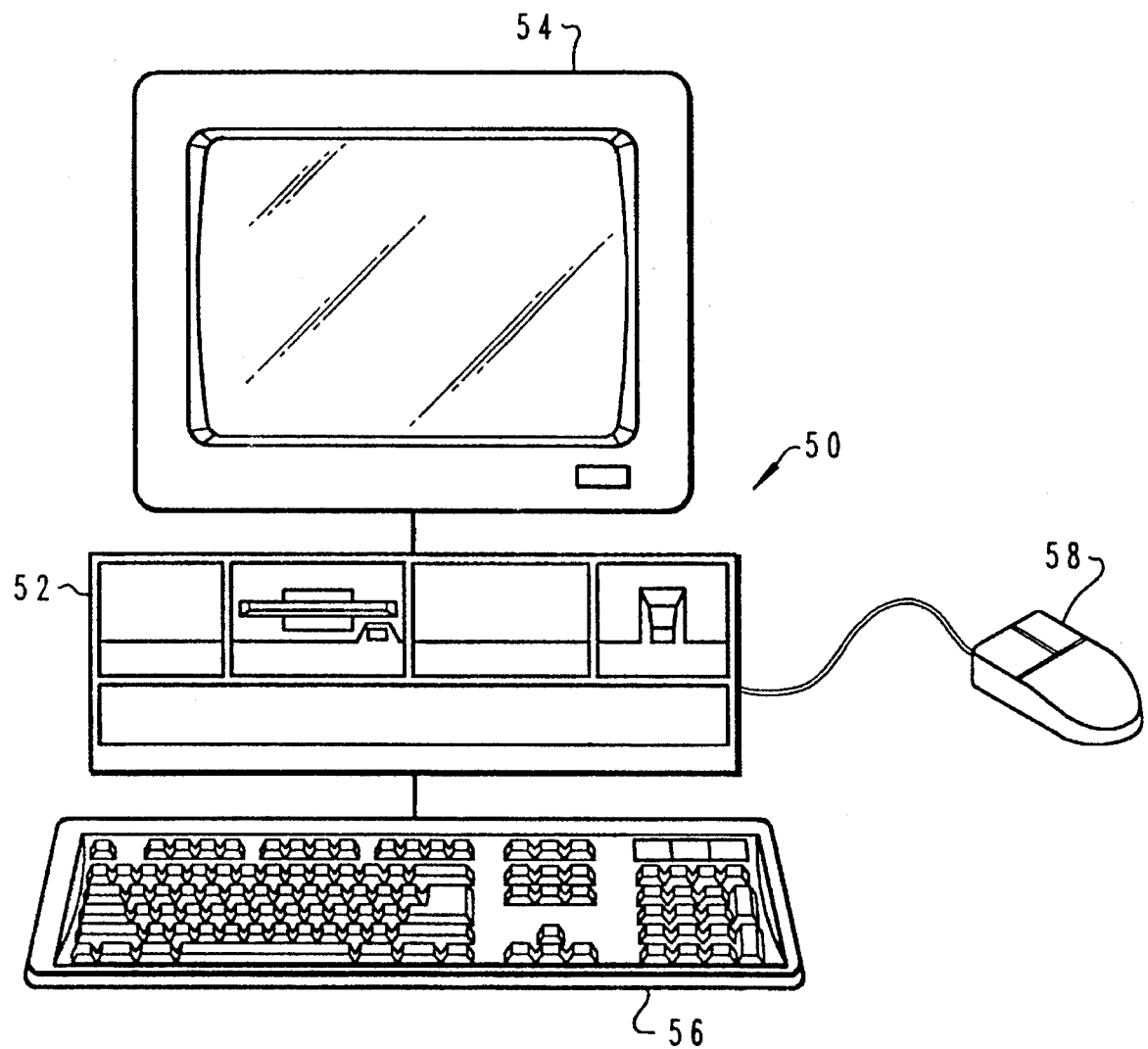
FIG. 1 depicts a pictorial illustration of a data processing system which may be utilized to implement the method and system of the present invention.

With reference now to the figures and in particular with reference to FIG. 1, there is depicted a pictorial illustration of a data processing system 50 which may be utilized to implement a preferred embodiment of the present invention. Data processing system 50 includes a system unit 52, a video display terminal 54, a keyboard 56, and a mouse 58. Data processing system 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Those skilled in the art will appreciate that the hardware depicted in FIG. 1 may vary for specific applications. For example, other peripheral devices such as: optical disk media, audio adapters, and the like may also be utilized in addition to the hardware depicted. Data processing system 50 may also include video storage devices (not shown) for storing digital data sets in either analog or digital formats. Examples of such video storage devices are laser disk players and video recording devices. Devices for storing, creating or manipulating audio data sets, such as compact disk players, MIDI interfaces, audio effects processors, digital samplers or synthesizers, also may be included in data processing system 50.

Figure 2:
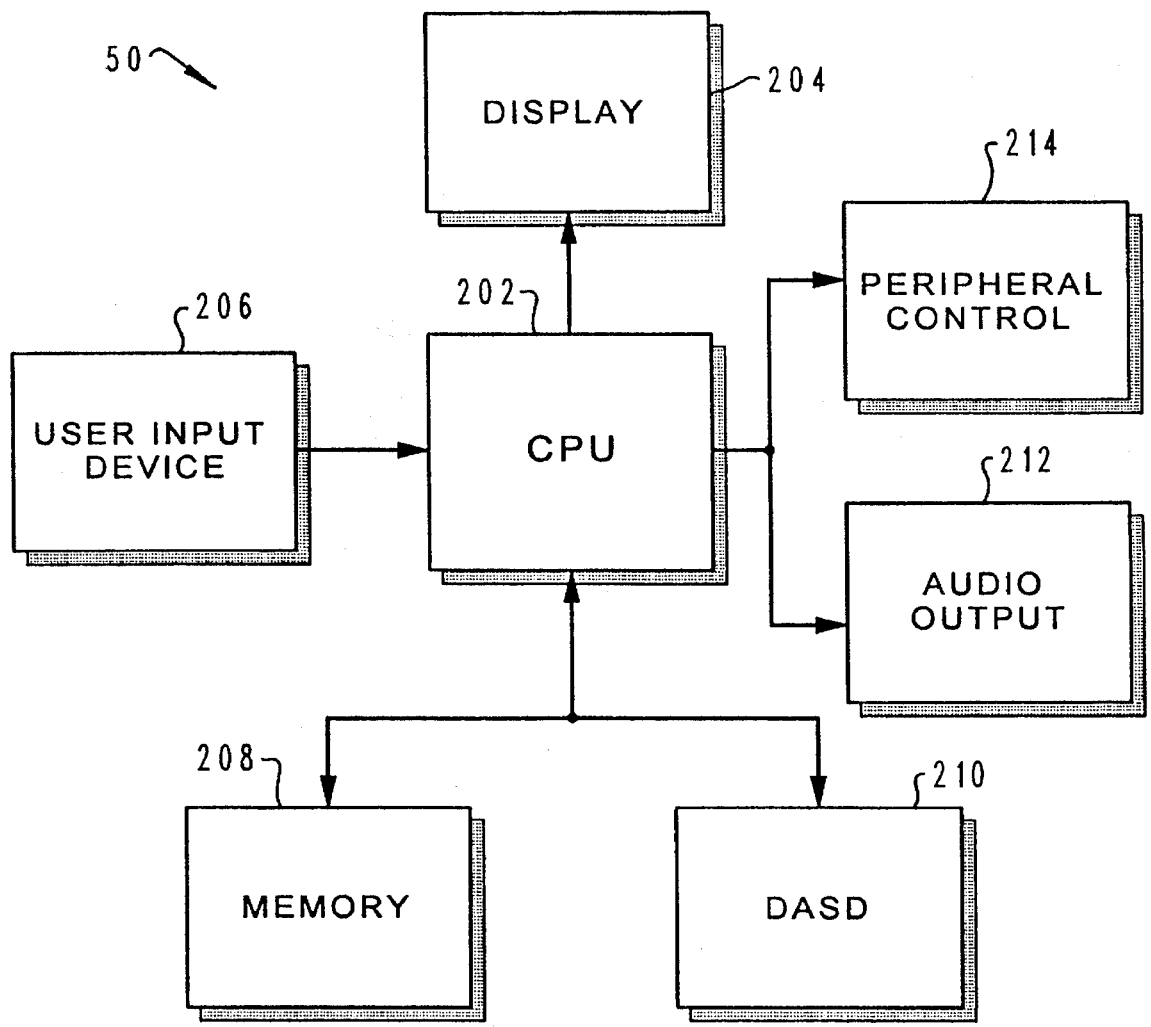
FIG. 2 is a more detailed high level block diagram further illustrating the data processing system of FIG. 1.

FIG. 2 is a high level block diagram further illustrating details of a preferred data processing system 50 as shown in FIG. 1. As illustrated, data processing system 50 is controlled primarily by software executed within central processing unit (CPU) 202. CPU 202 is coupled to display 204, and receives user input from user input device 206. CPU 202 is also coupled to memory 208 and one or more direct access storage devices (DASDs) depicted at block 210. Memory 208 and DASD 210 may be utilized for storing data sets which may comprise digital representations of text, graphics, sound, animated graphics, synthesized speech, and video. User input device 206 may be implemented utilizing a mouse, a touch sensitive tablet or screen, a joy stick, a track ball, or a screen activated light pen. CPU 202 is also preferably coupled to audio output device 212 and peripheral controller 214. Audio output device 212, which may include an amplifier and speaker system, may be utilized to present an audio portion of a multimedia presentation. Peripheral controller 214 may be utilized to control peripheral devices, such as a video player/recorder, a slide projector or a laser disk player (none are shown), during a multimedia presentation.

During a multimedia presentation, CPU 202 may select and access data sets comprising digital representations of text, graphics, animated graphics, and video, from memory 208 or DASD 210, and utilize display 204 to display the visual portion of a multimedia presentation. CPU 202 may also select and access data sets comprising digitized sound or data which may be utilized to produce synthesized speech, and thereafter utilize audio output device 212 to present the aural portion of a multimedia presentation.

Those persons skilled in the art will recognize that other media, besides aural and visual media, may be incorporated into a multimedia presentation. For example, the medium of motion may be utilized to communicate the feeling of flight to the user of a flight simulator. A data set representing commands to move the flight simulator in a predetermined fashion may be accessed by CPU 202, in response to input from user input device 206, and then transmitted, via peripheral controller 214, to the mechanism which moves the flight simulator.

Figure 3A:
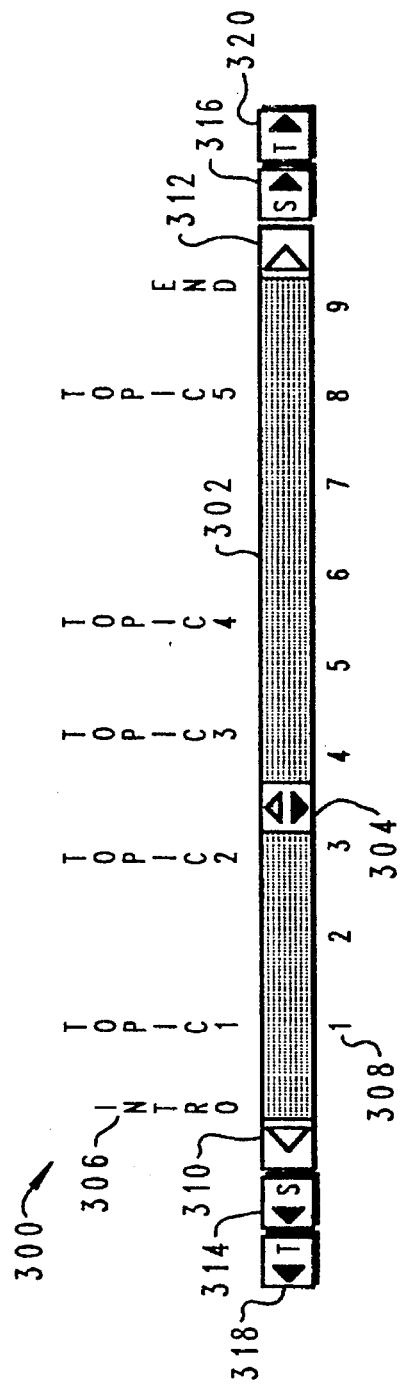
FIGS. 3a and 3b depict a pictorial representation of a display screen having a graphic control mechanism provided in accordance with the method and system of the present invention.

With reference now to FIG. 3a, there is depicted a pictorial representation of a display screen including a displayed graphic control mechanism in accordance with the present invention. In one preferred embodiment of the present invention, the graphic control mechanism is scroll bar 300. Those skilled in the art will appreciate that the graphic control mechanism may take the form of a scroll bar (as shown in FIG. 3a ), a slider control (not shown), or any other suitable graphic control mechanism. Scroll bar 300 includes scroll bar shaft 302, scroll box 304, topic labels 306, time labels 308, and scroll buttons 310, 312, 314, 316, 318, and 320. User input device 206 of FIG. 2 may be utilized to position scroll box 304 along scroll bar shaft 302 of scroll bar 300. As scroll box 304 is positioned along scroll bar shaft 302, selected frames within a multimedia presentation may be automatically presented.

As illustrated, topic labels 306 and time labels 308 are associated with portions of scroll bar 300. One way to associate topic labels 306 and time labels 308 with portions of scroll bar shaft 302 is to display topic labels 306 and time labels 308 at locations proximate to corresponding portions of scroll bar shaft 302. One skilled in the art will appreciate that topic labels 306 and time labels 308 need not be associated with scroll bar 300 simultaneously. In applications in which only topic labels 306 are associated with scroll bar 300, topic labels 306 may be evenly spaced, or alternatively, topic labels 306 may be spaced in a manner such that the location of the topic labels along scroll bar shaft 302 more closely resembles the temporal location of the topic within the multimedia presentation. When topic labels 306 and time labels 308 are both associated with scroll bar 300, as shown in FIG. 3a, topic labels 306 are typically placed proximate to a time label 308 which represents the relative time from the beginning of the multimedia presentation to the beginning of the topic.

Scroll buttons 310–320 may also be utilized to control the position of scroll box 304 along scroll bar shaft 302. In response to a user selection of scroll button 310, scroll box 304 moves to the left, and data processing system 50 accesses a previous frame within the multimedia presentation. Similarly, user selection of control button 312 moves scroll box 304 to the right along scroll shaft 302 and data processing system 50 accesses the next subsequent frame within the multimedia presentation. Scroll buttons 310 and 312 move scroll box 304 in one-frame increments. A single "frame" is the smallest portion represented along scroll bar shaft 302.

Scroll buttons 314 and 316 also move scroll box 304 along scroll bar shaft 302. However, scroll buttons 314 and 316 move scroll box 304 in increments of subjects. For example, user selection of scroll button 314 moves scroll box 304 to a location on scroll bar shaft 302 associated with the next previous topic within the multimedia presentation. User selection of scroll button 316 moves scroll box 304 along scroll bar shaft 302 to the next subsequent topic. Thus, as illustrated in FIG. 3a, in response to a user selection of scroll button 314, scroll box 304 would move to a portion of scroll bar shaft 302 associated with "topic 2." Similarly, in response to a user selection of scroll button 316, scroll box 304 would move to a portion of scroll bar shaft 302 associated with "topic 3."

In a similar manner, scroll buttons 318 and 320 may be utilized to move scroll box 304 along scroll bar shaft 302 in selected increments of time. For example, in response to a user selection of scroll button 318, scroll box 304 in FIG. 3a would move to a position along scroll bar shaft 302 associated with the "three minute" time label. Similarly, in response to a user selection of scroll button 320 in FIG. 3a, scroll box 304 would move to a portion of scroll bar shaft 302 associated with the "four minute" time label. The arrows depicted in scroll box 304 are optional, and not necessarily active "buttons." In the examples shown in FIGS. 3A and 3B, the arrows in scroll box 304 may be utilized to more precisely position scroll box 304 along scroll bar shaft 302 relative to topic labels 306 or time labels 308.

Figure 3B:
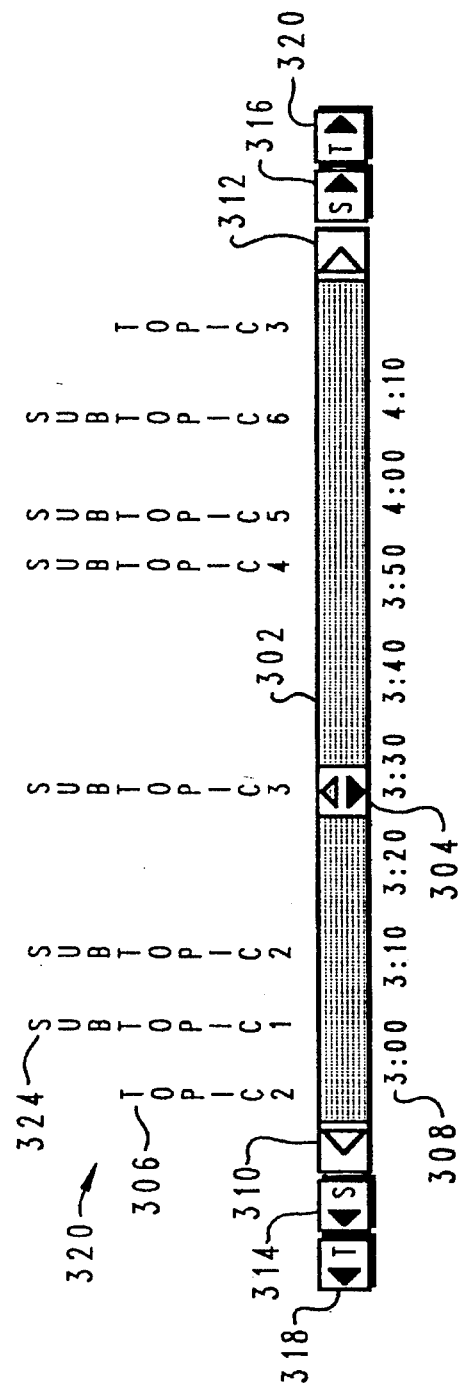

With reference now to FIG. 3b, there is depicted a scroll bar 321 which is displayed at a higher resolution than scroll bar 300 in FIG. 3a. That is, the entire length of scroll bar 321 in FIG. 3b represents a portion of the multimedia presentation, whereas scroll bar 300 in FIG. 3a represents the entire multimedia presentation. At the higher resolution utilized to display scroll bar 321, subtopic labels 324 may be displayed between topic labels 306. Time labels 308 are also displayed at a higher resolution in scroll bar 321. In FIG. 3b, time labels 308 are displayed along scroll bar shaft 302 in increments of ten seconds, whereas time labels 308 in FIG. 3a are displayed in one minute increments.

Those skilled in the art should recognize that selection of a portion of a multimedia presentation utilizing a scroll bar having a variable resolution may be accomplished by utilizing one or more scroll bars displayed simultaneously within display 204 of FIG. 2. However, if only one scroll bar is utilized, the resolution displayed along the scroll bar may be increased after the user makes an initial rough positioning of scroll box 304 along scroll bar shaft 302, thereby allowing a user to make a more accurate selection of a frame or subtopic within a multimedia presentation. If multiple scroll bars are utilized, a first scroll bar may represent the entire multimedia presentation, and a second scroll bar, having a higher resolution, may represent only a portion of the multimedia presentation which is centered about a time or topic selected along the first scroll bar. That is, each time the scroll box within a first lower resolution scroll bar is repositioned, the second, higher resolution scroll bar is updated to show time or topics or subtopics in the area proximate to the selected portion in the first scroll bar.

Figure 4:
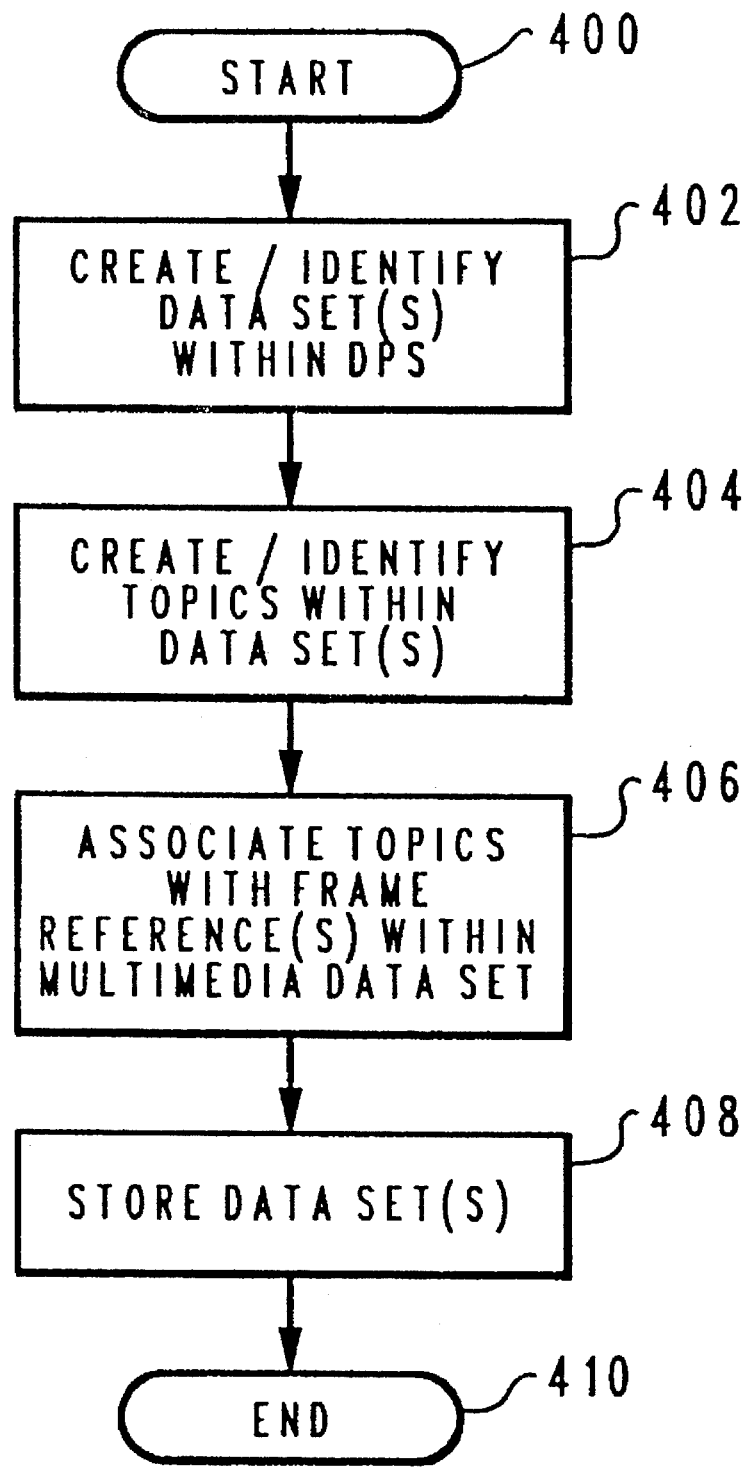
FIG. 4 depicts a logic flowchart of the process performed in establishing an associated multimedia data set according to the method and system of the present invention.

With reference now to FIG. 4, there is depicted a flowchart of the process performed in establishing an associated multimedia data set in accordance with the method and system of the present invention. Terminal block 400 represents the entry point to the process. First, as depicted at block 402, data sets, which may include a multimedia presentation comprised of a plurality of topics, are created or identified within data processing system 50.

Next, topics are created or identified within the data set, as depicted at block 404. Those skilled in the art should appreciate that "topics" need not be limited to mean a portion of a multimedia presentation relating to a common subject matter. Topics may also imply a temporal or physical location within a multimedia presentation. For example, the topics "beginning", "middle", and "end" may refer to physical locations of portions of the multimedia data set. Alternatively, topics may also refer to "acts" or "scenes," in a theatrical presentation. Topics may also be related to the absolute or relative time within the multimedia presentation, rather than the subject matter at that particular time.

Next, as illustrated at block 406, the process associates the previously identified topics with a particular frame within the multimedia data set. SMPTE time codes, as discussed previously, may be utilized to associate topics with particular frames within the multimedia data set. The data set, which includes topics and associated frame references, is then stored within data processing system 50, as depicted at block 408. Data processing system 50 may also include video storage devices such as laser disk players and video tape machines. Audio storage devices, such as compact disk players, may also be included in data processing system 50. Terminal block 410 represents the end of the process utilized to establish multimedia data sets in accordance with the method and system of the present invention.

Figure 5:
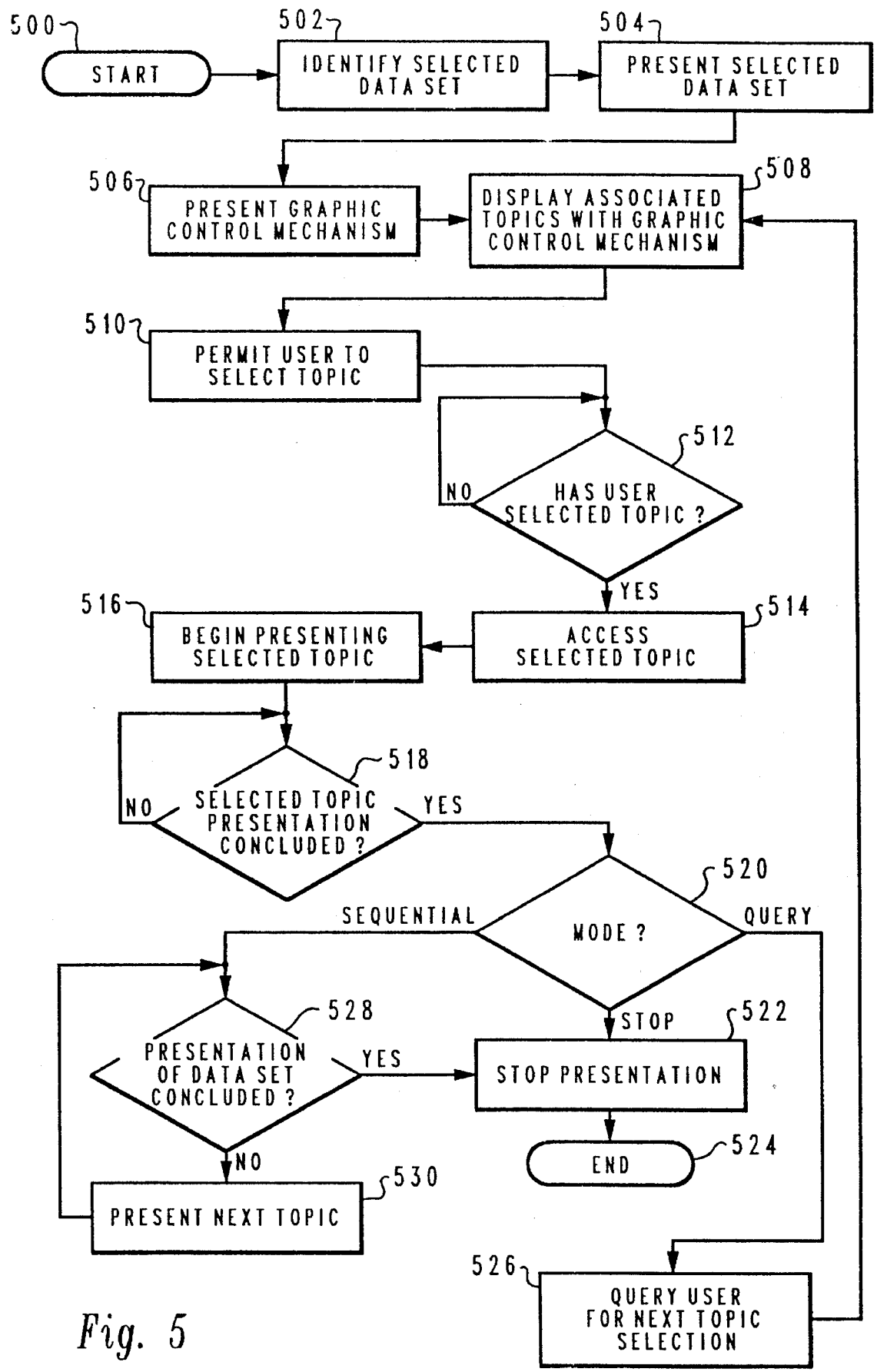
FIG. 5 depicts a logic flowchart of the process performed in manipulating the selection and/or presentation of a multimedia data set according to the method and system of the present invention.

With reference now to FIG. 5, there is depicted a flowchart of the process performed in manipulating the presentation of multimedia data sets in accordance with the method and system of the present invention. Terminal block 500 represents the entry point to the process. First, as illustrated at block 502, a user identifies a selected data set stored within data processing system 50. Next, as depicted at block 504, the process begins presenting the selected data set utilizing display 204, audio output 212, and peripheral control 214, as required. The process next presents a graphic control mechanism utilizing display 204, as illustrated at block 506. Next, the process displays the associated topics in association with the graphic control mechanism, as depicted at block 508.

As illustrated at block 510, the process then permits a user to select a topic by manipulating the displayed graphic control mechanism utilizing user input device 206. User input device 206 may be a mouse, a touch sensitive tablet or screen, a joy stick, a track ball, or a screen activated light pen. The process then waits for a user to select a topic utilizing the graphic control mechanism, as illustrated at decision block 512. After a user has selected a topic, the process accesses the selected topic and begins presenting the selected topic, as depicted at blocks 514 and 516.

The process next determines whether or not the selected topic presentation has concluded, as illustrated at decision block 518. If the selected topic presentation has not concluded, presentation of the selected topic continues. If the selected topic presentation has concluded, the process will proceed in a fashion dependant upon the mode of operation of the process.

Referring now to decision block 520, the process determines whether the "sequential" mode, the "stop" mode, or the "query" mode is currently being utilized. If the sequential mode is currently being utilized, the process then determines whether or not the presentation of the entire multimedia data set has concluded, as illustrated at decision block 528. If the presentation of the data set has not concluded, the process presents the next sequential topic, as depicted at block 530. If the presentation of the data set has concluded, the process terminates tile presentation, as illustrated at block 522, and the process ends, as depicted at terminal block 524.

Referring again to decision block 520, if the process determines that the stop mode is currently being utilized, the presentation is terminated after the presentation of the selected topic has concluded, as illustrated at block 522. The process then terminates, as depicted at terminal block 524.

Finally, if the process determines that the query mode is currently being utilized, as illustrated at decision block 520, the user is queried for the selection of an alternate topic, as depicted at block 526. After asking the user to select an alternate topic, the graphic control mechanism is displayed along with associated topics, as illustrated at block 508, and the user is allowed to select the next topic.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently managing the presentation within a display of a multimedia data set having a plurality of topics that each have a presentation time necessary for presenting said topic in said data processing system, said method comprising the data-processing-system-implemented steps of:

displaying a graphic control mechanism having a plurality of portions within said data processing system;

associating each of said plurality of topics with one of said plurality of portions of said graphic control mechanism, wherein each of said plurality of portions is proportionately sized to graphically indicate a presentation time for said associated topic;

displaying textual indicia in locations proximate to each associated one of said plurality of proportionately-sized portions of said graphic control mechanism for indicating said association between said plurality of topics and said plurality of portions of said graphic control mechanism wherein said textual indicia is displayed with spacing between said locations for indicating a relative temporal location of each of said plurality of topics within said multimedia data set;

permitting a user to select one of said plurality of portions of said graphic control mechanism; and automatically presenting an associated one of said plurality of topics within said data processing system in response to a user selection of one of said plurality of portions of said graphic control mechanism, wherein presentation of said plurality of topics within said multimedia data set may be efficiently managed.

2. A method in a data processing system for efficiently managing the presentation of said multimedia data set according to claim 1 wherein the step of displaying a graphic control mechanism having a plurality of portions comprises displaying a scroll bar having a plurality of portions.

3. A method in a data processing system for efficiently managing the presentation of said multimedia data set according to claim 1 wherein the step of displaying a graphic control mechanism having a plurality of portions comprises displaying a slider control having a plurality of portions.

4. A method in a data processing system for efficiently managing the presentation of said multimedia data set according to claim 1 wherein said graphic control mechanism includes at least one user selectable graphic control button and wherein the step of permitting a user to select one of said plurality of portions of said graphic control mechanism further includes the step of selecting an alternate one of said plurality of topics in response to a user selection of said at least one user selectable graphic control button.

5. A method in a data processing system for efficiently managing the presentation of said multimedia data set according to claim 1 wherein said graphic control mechanism includes said textual indicia displayed at a selected resolution and wherein the step of permitting a user to select one of said plurality of portions of said graphic control mechanism further includes the step of changing said selected resolution in response to a user selection of one of said plurality of portions.

6. A method in a data processing system for efficiently managing the presentation of said multimedia data set according to claim 1 wherein said graphic control mechanism includes a first graphic control mechanism having a plurality of portions and having said textual indicia displayed at a first selected resolution and a second graphic control mechanism having a plurality of portions and having textual indicia displayed at a second selected resolution, and wherein said step of permitting a user to select one of said plurality of portions of said graphic control mechanism further includes the step of changing a range of portions displayed in said second graphic control mechanism in response to a user selection of one of said plurality of portions within said first graphic control mechanism.

7. A method in a data processing system for efficiently managing the presentation of said multimedia data set according to claim 6 wherein said first selected resolution of said first graphic control mechanism having a plurality of portions and having said textual indicia displayed is a lower resolution than said second selected resolution of said second graphic control mechanism having a plurality of portions and having said textual indicia displayed and wherein said step of changing a range of portions displayed in said second graphic control mechanism in response to a user selection of one of said plurality of portions within said first graphic control mechanism further includes the step of displaying a range of portions in said second graphic control mechanism centered about said selected one of said plurality of portions within said first graphic control mechanism.

8. A data processing system for efficiently managing the presentation within a display of a multimedia data set having a plurality of topics that each have a presentation time necessary for presenting said topic in said data processing system, said system comprising:

means for displaying a graphic control mechanism having a plurality of portions within said data processing system;

means for associating each of said plurality of topics with one of said plurality of portions of said graphic control mechanism, wherein each of said plurality of portions is proportionately sized to graphically indicate a presentation time for said associated topic;

means for displaying textual indicia in locations proximate to each associated one of said plurality of proportionately-sized portions of said graphic control mechanism for indicating said association between said plurality of topics and said plurality of portions of said graphic control mechanism, wherein said locations are spaced apart for indicating a relative temporal location of each of said plurality of topics within said multimedia data set;

means for permitting a user to select one of said plurality of portions of said graphic control mechanism; and means for automatically presenting an associated one of said plurality of topics within said data processing system in response to a user selection of one of said plurality of portions of said graphic control mechanism, wherein presentation of said plurality of topics within said multimedia data set may be efficiently managed.

9. The data processing system for efficiently managing the presentation of said multimedia data set according to claim 8 wherein said means for displaying a graphic control mechanism having a plurality of portions comprises means for displaying a scroll bar having a plurality of portions.

10. The data processing system for efficiently managing the presentation of said multimedia data set according to claim 8 wherein said means for displaying a graphic control mechanism having a plurality of portions comprises means for displaying a slider control having a plurality of portions.

11. The data processing system for efficiently managing the presentation of said multimedia data set according to claim 8 wherein said graphic control mechanism includes at least one user selectable graphic control button and wherein said means for permitting a user to select one of said plurality of portions of said graphic control mechanism further includes means for selecting an alternate one of said plurality of topics in response to a user selection of said at least one user selectable graphic control button.

12. The data processing system for efficiently managing the presentation of said multimedia data set according to claim 8 wherein said graphic control mechanism includes said textual indicia displayed at a selected resolution and wherein said means for permitting a user to select one of said plurality of portions of said graphic control mechanism further includes means for changing said selected resolution in response to a user selection of one of said plurality of portions.

13. A method in a data processing system for efficiently managing the presentation of said multimedia data set according to claim 8 wherein said graphic control mechanism includes a first graphic control mechanism having a plurality of portions and having said textual indicia displayed at a first selected resolution and a second graphic control mechanism having a plurality of portions and having textual indicia displayed at a second selected resolution, and wherein said means for permitting a user to select one of said plurality of portions of said graphic control mechanism further includes means for changing a range of portions displayed in said second graphic control mechanism in response to a user selection of one of said plurality of portions within said first graphic control mechanism.

14. The data processing system for efficiently managing the presentation of said multimedia data set according to claim 13 wherein said first selected resolution of said first graphic control mechanism having a plurality of portions and having said textual indicia displayed is a lower resolution than said second selected resolution of said second graphic control mechanism having a plurality of portions and having said textual indicia displayed and wherein said means for changing a range of portions displayed in said second graphic control mechanism in response to a user selection of one of said plurality of portions within said first graphic control mechanism further includes means for displaying a range of portions in said second graphic control mechanism centered about said selected one of said plurality of portions within said first graphic control mechanism.

15. A method in a data processing system for efficiently managing the presentation within a display of a multimedia data set having a plurality of topics, wherein each of said plurality of topics may be further divided into subtopics, wherein each of said topics and subtopics have a presentation time necessary for presenting said topic in said data processing system, said method comprising the data-processing-system-implemented steps of:

displaying a graphic control mechanism having a first plurality of portions within said data processing system;

associating selected ones of said plurality of topics with one of said first plurality of portions of said graphic control mechanism, wherein each of said first plurality of portions is proportionately sized to graphically indicate a presentation time for said associated topic;

displaying textual indicia in locations proximate to each associated one of said plurality of proportionately-sized portions of said graphic control mechanism for indicating said association between said selected ones of said plurality of topics and said first plurality of portions of said graphic control mechanism, wherein spacing between said locations is selected to indicate a relative temporal location of each of said plurality of topics within said multimedia data set;

permitting a user to select a selected one of said first plurality of portions of said graphic control mechanism, wherein said selected one of said portions is asscoated with a selected topic;

displaying a graphic control mechanism having a second plurality of portions;

associating said selected topic and at least one subtopic with one of said second plurality of portions of said graphic control mechanism, wherein each of said second plurality of portions is proportionately sized to graphically indicate a presentation time for said associated topic or subtopic;

permitting a user to select one of said second plurality of portions of said graphic control mechanism; and automatically presenting an associated one of said plurality of subtopics within said data processing system in response to a user selection of one of said second plurality of portions of said graphic control mechanism, wherein presentation of said plurality of topics or subtopics within said multimedia data set may be efficiently managed.

16. The method in a data processing system for efficiently managing the presentation of said multimedia data set according to claim 15 wherein the steps of displaying a graphic control mechanism having a first plurality of portions and displaying a graphic control mechanism having a second plurality of portions comprise displaying a scroll bar having a first plurality of portions and displaying a scroll bar having a second plurality of portions.

\* \* \* \* \*